Dec. 9, 1930.  A. E. ENGLUND  1,784,002

CHUCK

Filed Sept. 8, 1926

INVENTOR
Albert E. Englund,
by
Arthur B. Jenkins,
ATTORNEY

Patented Dec. 9, 1930

1,784,002

UNITED STATES PATENT OFFICE

ALBERT E. ENGLUND, OF WEST HARTFORD, CONNECTICUT, ASSIGNOR TO THE JACOBS MANUFACTURING COMPANY, OF HARTFORD, CONNECTICUT, A CORPORATION OF CONNECTICUT

CHUCK

Application filed September 8, 1926. Serial No. 134,175.

My invention relates more especially to that class of chucks commonly referred to as "drill chucks", and an object of my invention, among others, is the provision of a chuck of this type that shall be simple in construction and particularly efficient in operation.

One form of chuck embodying my invention and in the construction and use of which the objects herein set out, as well as others, may be attained, is illustrated in the accompanying drawings, in which—

Figure 1:
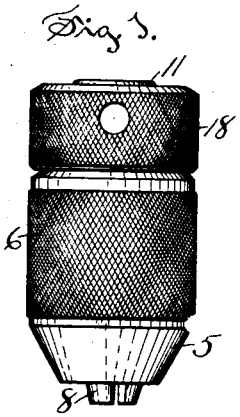
Figure 1 is a view in side elevation of a chuck embodying my invention.

In the accompanying drawings the numeral 5 indicates the body that is tapered at its end in a manner common to chucks of this class and that is threaded at one end for engagement with the screw threaded end of a sleeve 6. The threaded end of the body 5 is reduced in diameter to form a shoulder at the inner end of the thread and the bore of the sleeve 6 is increased in diameter at its threaded portion, which increased bore portion is of greater axial length than the reduced end portion of the body. This construction will permit of the sleeve being threaded onto the body a sufficient distance to cause the end face of the sleeve to bind against the shoulder on the body for frictionally locking the sleeve to the body, whereby these two elements will rotate together. Holes 7 are also provided to receive chuck jaws 8 that are attached at their inner ends to a jaw carrier 9 having a central threaded opening for the reception of a threaded actuating stud 10 projecting from the end of a support 11. This support has a tapered opening 12 to receive the tapered end of a drill spindle by means of which the chuck is secured to said spindle.

The end of the support has a flange 13 upon which a ball bearing 14 is mounted as a means for rotatably supporting the sleeve 6.

In chucks of this type it is desirable, in order to provide an inexpensive construction, that the chuck jaws 8 shall be round in form in cross section, whereby they may be constructed from a rod of stock, and I have, therefore, so adapted my construction that the jaws may be so made, and at the same time so that they may be attached to the carrier 9 without danger of disengagement therefrom.

To this end recesses 15 are formed in the ring 9, there preferably being three of these recesses, one for each of the three jaws 8. These recesses, in fact, constitute round bores extending radially within the ring and with slots opening out of the recesses on one side thereof. It will be seen in Fig. 2 that the inner ends of the recesses 15 and their slots terminate outwardly of the internally threaded bore of the carrier 9. The terminating of the recesses and sleeves in this manner and the locating of the jaw heads 16 on the radial outer sides of the ends of the jaws prevent the heads from contacting with the thread on the stud 10. Should the jaw heads be permitted to contact with the thread on the stud, injury to the latter would result.

The ends of each of the jaws 8 are provided with heads 16 that are round in cross section to fit the recesses 15, these heads being narrowed as at 17 to fit slots hereinbefore referred to opening out of the recesses 15. These heads are formed at an angle to the main part 8 of the jaw, the disposition of said heads being such that they extend substantially parallel with the axis of the chuck.

Figure 2:
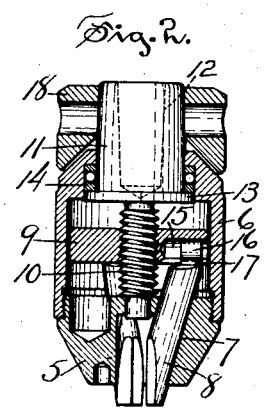
Figure 2 is a view in lengthwise section through my improved chuck.
Figure 3:
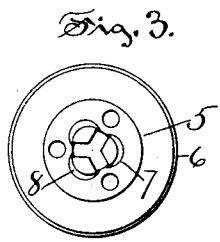
Figure 3 is an end view of the same.

It will be noted that the inner end of each jaw 8 is formed with a shoulder arranged at an oblique angle with respect to the axis of the jaw and from which the narrowed portion 17 extends. The angle of the axis of each head 16 is parallel with the angle of its respective shoulder. Figure 2 clearly shows the end faces of a head 16 as being squared with respect to the axis of the head whereby the latter may completely approach the opposite ends of its respective recess.

Figure 4:
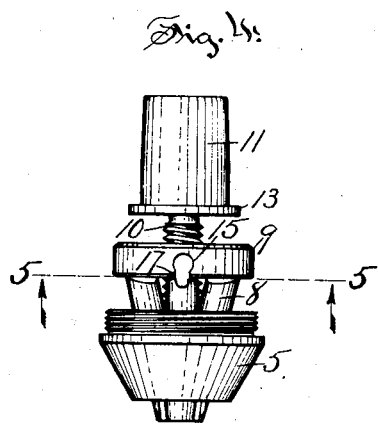
Figure 4 is a side view of the interior mechanism assembled.
Figure 5:
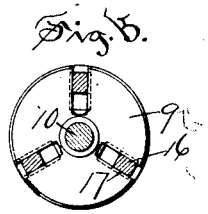
Figure 5 is a view in section on a plane denoted by the dotted line 5—5 of Figure 4.

In assembling the parts comprising the chuck the heads 16 are engaged within their recesses before the parts are slipped into the sleeve 6 and if desired the interior portions of the structure may be assembled, as shown in Figure 4, before insertion in the sleeve 6.

In some forms of construction of drill spindles for receiving chucks of this type there is little resistance to rotation of the spindle when disconnected from the driving power, and I have, therefore, provided means whereby the spindle may be held for the purpose of enabling the sleeve 6 to be rotated for the purpose of operating the jaws.

This improvement comprises a holding ring 18 that is secured to the support 11 in any desired manner, the sleeve 6 and ring 18 being preferably knurled or otherwise roughened so that they may be grasped by the hand and thereby the spindle may be held by one hand while the other hand is employed to turn the sleeve 6 to loosen or tighten the chuck jaws.

In operation the sleeve 6 is rotated independently of the stud 10, and the jaws being secured in the openings in the body 5 and also secured to the carrier 9 will cause said carrier to be rotated on the stud whereby the chuck jaws may be moved in or out depending upon the direction of rotation of the sleeve 6.

The ring 18 is preferably secured to the support 11 by a tapered driving fit, and the ring thus formed and secured provides a means for strengthening the support 11.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A chuck comprising a body having openings therein, a support, a sleeve for housing jaw actuating mechanism detachably connected to and rotatable with the body but independently of said support, chuck jaws mounted in said openings and operatively connected with said sleeve to be rotated therewith and moved axially during such rotation, and a holder immovably secured to said support to rotate with the chuck when the latter is in operation and acting as a means for retaining the support against rotation when said sleeve is rotated.

2. A chuck comprising a body having openings therein, a support, a sleeve rotatably mounted on said support and carrying said body, chuck jaws supported in said openings, an operative connection between said chuck jaws and support for operation of the former during rotation of the sleeve, and a holder ring secured to said support to prevent rotation thereof when said sleeve is operated to actuate said jaws.

3. A chuck comprising a body having holes therein and a reduced inner end forming a shoulder, chuck jaws located in the said holes and being of greater axial length than said body, a support, a threaded stud projecting from the support and having only an end portion entering and bearing in said body, a carrier threaded on said stud and operatively connected to said jaws, a sleeve rotatably bearing on the support and having a greater length than that of the stud so as to enclose the stud, the carrier, and the inner end portions of the jaws so that these elements will be exposed when the sleeve is removed from the body, and means interlockingly connecting the sleeve to the reduced end of the body to cause the same to rotate together.

ALBERT E. ENGLUND.